United States Patent [19]
Foti

[11] Patent Number: 5,758,279
[45] Date of Patent: May 26, 1998

[54] SYSTEM AND METHOD OF RAPID VOICE MAIL ACCESS IN A RADIO TELECOMMUNICATIONS NETWORK

[75] Inventor: George Foti, Dollard des Ormeaux, Canada

[73] Assignee: Telefonaktiebolaget LM Ericsson, Stockholm, Sweden

[21] Appl. No.: 631,243

[22] Filed: Apr. 12, 1996

[51] Int. Cl.⁶ .................................... H04Q 7/22
[52] U.S. Cl. .................. 455/412; 455/413; 455/414; 455/415; 379/67; 379/88
[58] Field of Search ............... 455/412, 413, 455/414, 415; 379/67, 88, 68, 69, 89

[56] References Cited

U.S. PATENT DOCUMENTS

| | | | |
|---|---|---|---|
| 4,853,952 | 8/1989 | Jachmann et al. | 379/88 |
| 5,511,111 | 4/1996 | Serbetcioglu et al. | 455/412 |

FOREIGN PATENT DOCUMENTS

WO 92/14330  8/1992  Finland .

*Primary Examiner*—Dwayne D. Bost
*Assistant Examiner*—Keith Ferguson
*Attorney, Agent, or Firm*—Steven W. Smith

[57] ABSTRACT

A system and method for providing rapid access to voice mail messages to a subscriber in a radio telecommunications network. The subscriber has a mobile telephone with a display, and the system comprises a mobile switching center (MSC) which includes a group switch for routing calls, and hardware connected to the group switch that enables the MSC to establish three-party calls. The system also includes an announcement machine connected to the MSC and a voice mail machine connected to the MSC. The system causes the display of the subscriber's mobile telephone to display the telephone number of the mobile telephone as a calling line identification (CLI) number when a call is made from the announcement machine to the mobile telephone announcing that the subscriber has a message in the voice mail machine. The system also sends the telephone number of the mobile telephone to the MSC and establishes a three-party call between the announcement machine, the subscriber, and the voice mail machine.

6 Claims, 3 Drawing Sheets

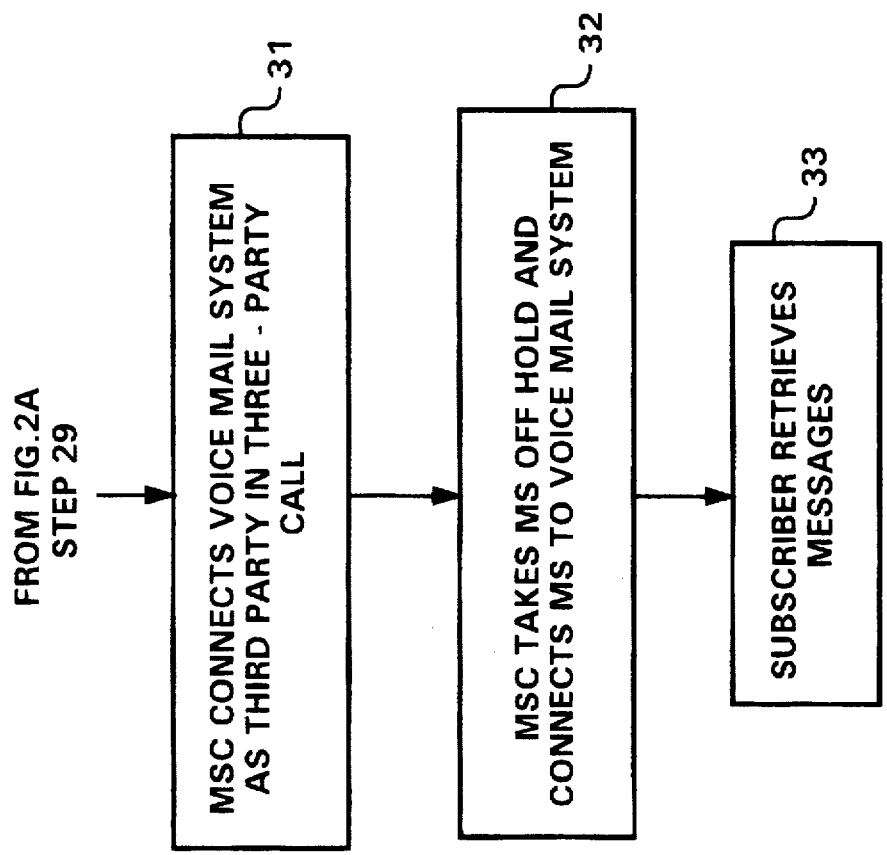

SYSTEM AND METHOD OF RAPID VOICE MAIL ACCESS IN A RADIO TELECOMMUNICATIONS NETWORK

BACKGROUND OF THE INVENTION

1. Technical Field of the Invention

This invention relates to radio telecommunication systems and, more particularly, to a system and method of rapid access to voice mail messages in a radio telecommunications network.

2. Description of Related Art

Existing radio telecommunications networks offer a subscriber feature known as Message Waiting Indicator (MWI). If a subscriber subscribes to MWI and receives a message in voice mail, the subscriber is notified that a message is waiting. The subscriber may be notified in one of several ways. First, the network may call the subscriber, and when the subscriber answers, an announcement is played indicating that the subscriber has a message waiting. Second, if the mobile station supports a message waiting function, an indicator on the mobile station, such as a light, is activated to notify the subscriber that a call is waiting in his voice mail box. Third, the network may send a tone to the subscriber the next time the subscriber originates a call, indicating that there is a message in voice mail. Fourth, in digital systems, a short message service (SMS) message may be sent to the mobile station and displayed as text on the display.

Whenever the first method is utilized, and the network calls the subscriber and plays an announcement, the subscriber must then hang up, and dial his own telephone number in order to access the voice mail system and retrieve his message. It is a cumbersome and time-consuming process for a subscriber to repeatedly have to dial his own telephone number when retrieving voice mail messages.

Although there are no known prior art teachings of a solution to the aforementioned deficiency and shortcoming such as that disclosed herein, U.S. Pat. No. 4,853,952 to Jachmann et al. discusses subject matter that bears some relation to matters discussed herein. Jachmann discloses a wireline voice mail system for storage and forwarding of voice signals. However, Jachmann does not teach or suggest any system or method for rapid access to voice mail in a radio telecommunications network.

Review of the foregoing reference reveals no disclosure or suggestion of a system or method such as that described and claimed herein.

In order to overcome the disadvantage of existing solutions, it would be advantageous to have a system and method for rapid access to voice mail in a radio telecommunications network. Such a system and method would not require the subscriber to dial his own telephone number to retrieve voice mail messages whenever the network has called the subscriber to notify him that a message is waiting. While in conversation mode, the subscriber merely dials a feature code such as #66, presses the send key, and the message is retrieved. The present invention provides such a system and method.

SUMMARY OF THE INVENTION

In one aspect, the present invention is a system for providing rapid access to voice mail messages to a subscriber in a radio telecommunications network. The subscriber has a mobile telephone with a display, and the system comprises a mobile switching center (MSC) which includes a group switch for routing calls, and hardware connected to the group switch that enables the MSC to establish three-party calls. The system also includes an announcement machine connected to the MSC, a voice mail machine connected to the MSC, and means for causing the display of the subscriber's mobile telephone to display the telephone number of the mobile telephone as a calling line identification (CLI) number when a call is made from the announcement machine to the mobile telephone announcing that the subscriber has a message in the voice mail machine. The system also includes means for sending the telephone number of the mobile telephone to the MSC and means within the MSC for establishing a three-party call between the announcement machine, the subscriber, and the voice mail machine.

In another aspect, the present invention is a method of providing rapid access to voice mail messages to a subscriber in a radio telecommunications network having a mobile switching center (MSC) connected to an announcement machine and a voice mail machine. The subscriber has a mobile telephone with a telephone number and a SEND key. The method begins with the steps of determining whether the subscriber subscribes to an enhanced message waiting indicator (MWI) feature, placing a call from the announcement machine to the mobile telephone upon determining that the subscriber subscribes to the enhanced MWI feature, and sending the telephone number of the mobile telephone from the MSC to the mobile telephone as a calling line identification (CLI) number. The method also includes determining whether the subscriber has pressed the SEND key on the mobile telephone while in the conversation mode, sending the CLI number and a SEND signal to the MSC upon determining that the subscriber has pressed the SEND key, placing the call from the announcement machine to the mobile telephone on hold while establishing a third-party call to the voice mail machine, and connecting a call between the mobile telephone and the voice mail machine, thereby enabling the subscriber to retrieve the voice mail messages.

In yet another aspect, the present invention is a system for providing rapid access to voice mail messages to a subscriber in a radio telecommunications network. The system comprises a programmable mobile telephone, a mobile switching center (MSC) for providing radio telecommunications to the programmable mobile telephone, an announcement machine connected to the MSC, and a voice mail machine connected to the MSC. The system further comprises means within the MSC for establishing a call from the announcement machine to the programmable mobile telephone announcing that the subscriber has a message in the voice mail machine. There is also means within the programmable mobile telephone for determining whether the subscriber has entered an activation code, and means within the programmable mobile telephone for clearing the call from the announcement machine and originating a second call to the voice mail machine upon determining that the subscriber has entered the activation code.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIGS. 2A–2B are a flow chart of the steps involved in the preferred method of the present invention.

DETAILED DESCRIPTION OF EMBODIMENTS

Figure 1:
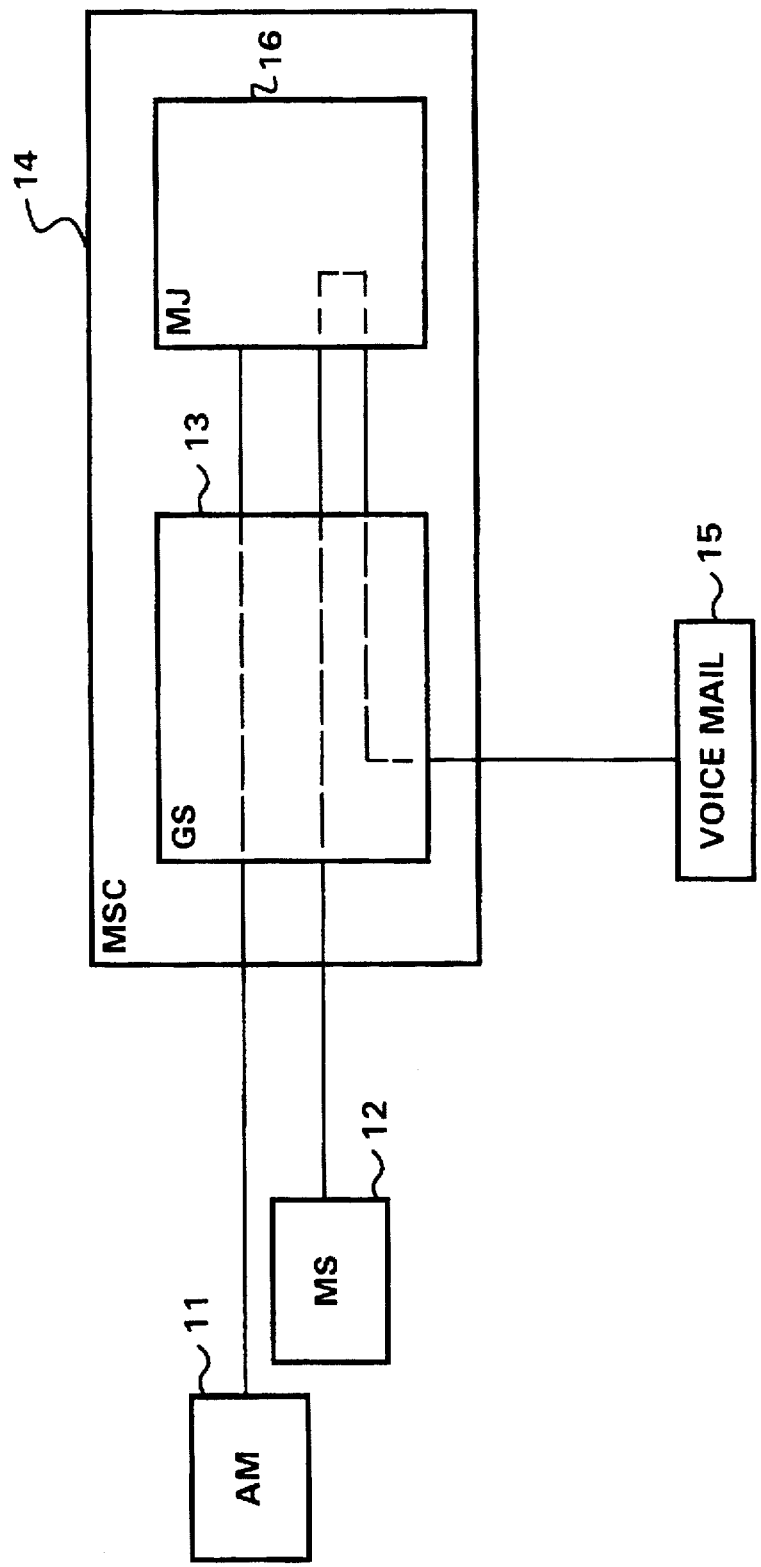
FIG. 1 is a high level block diagram of the components of the preferred embodiment of the system of the present invention.

FIG. 1 is a high level block diagram of the components of the system of the present invention. An announcement machine (AM) 11 and a mobile subscriber (MS) 12 are connected to a group switch (GS) 13 within a mobile switching center (MSC) 14. A voice mail system 15 is also connected to the group switch 13. The GS 13 is further connected to a multi-junction (MJ) box 16 which includes the necessary hardware to enable the MSC 14 to establish a three-party call between the announcement machine 11, the subscriber 12, and the voice mail system 15. The design of such hardware is well known in the telecommunications art, and need not be further discussed herein. Although the voice mail system in FIG. 1 is illustrated as being connected to the same MSC as the mobile station, it should be understood that the voice mail machine may be connected to a different MSC and still be within the scope of the present invention. Standard intersystem signaling messages are utilized for call setup, and a voice trunk is established between the exchanges.

A first embodiment of the present invention requires that the subscriber 12 subscribe to an Enhanced Message Waiting Indicator (Enhanced MWI) feature as well as voice mail. This embodiment requires support from both the mobile telephone and the telecommunications network for implementation of the Enhanced MWI feature. When the subscriber has a message waiting in the voice mail system 15, the MSC 14 places a call to the subscriber and plays an announcement from the announcement machine 11 to advise the subscriber that there is a message in his voice mail box. During this announcement, the subscriber's telephone displays the subscriber's own telephone number as a calling line identification (CLI) number. If the subscriber then presses the SEND key while in conversation mode, the telephone sends the displayed digits of the CLI number and a SEND signal to the MSC 14. This may require modification of the mobile telephone, but such modification is within the capability of those skilled in the telecommunications art, and will not be described further herein. Upon receipt of the digits in the MSC 14, the MSC performs a process to connect the subscriber 12 to his voice mail system 15 for retrieval of his message(s).

The MSC emulates a three-party call between the announcement machine 11 that notified the subscriber that a message was waiting in his voice mail box, the subscriber 12, and the voice mail system 15 in order to establish the connection between the subscriber and the voice mail system. While the MSC 14 attempts to establish the call to the voice mail system 15 via the MJ box 16, the subscriber is connected to the MJ box and put on hold. Once the MSC 14 successfully establishes the connection to the voice mail system 15, the subscriber is taken off hold and connected to the voice mail system.

A second embodiment of the present invention requires support from the telecommunications network, but not the mobile telephone, in order to implement the Enhanced MWI feature. In this embodiment, the subscriber 12 may indicate his desire to connect to the voice mail system 15 by sending a service code (for example, *23) to the MSC 14 while in conversation mode. The MSC then establishes the three-party call via the MJ hardware 16.

A third embodiment of the present invention requires support from the mobile telephone, but not the telecommunications network, in order to implement the Enhanced MWI feature. The subscriber must subscribe to voice mail, but need not subscribe to an Enhanced MWI feature. Instead, the subscriber's mobile telephone is programmable and is programmed to clear a call and establish a new call to the subscriber's own subscriber number (SNB) (the subscriber's voice mail number) whenever the subscriber enters an activation code on his mobile telephone. Once the subscriber 12 receives the announcement that he has a message in voice mail, the subscriber activates the voice mail program in his mobile telephone by typing in the activation code. The telephone then clears the call from the announcement machine 11 and initiates a new call to the voice mail system 15 utilizing the subscriber's SNB as the called number.

Figure 2A:
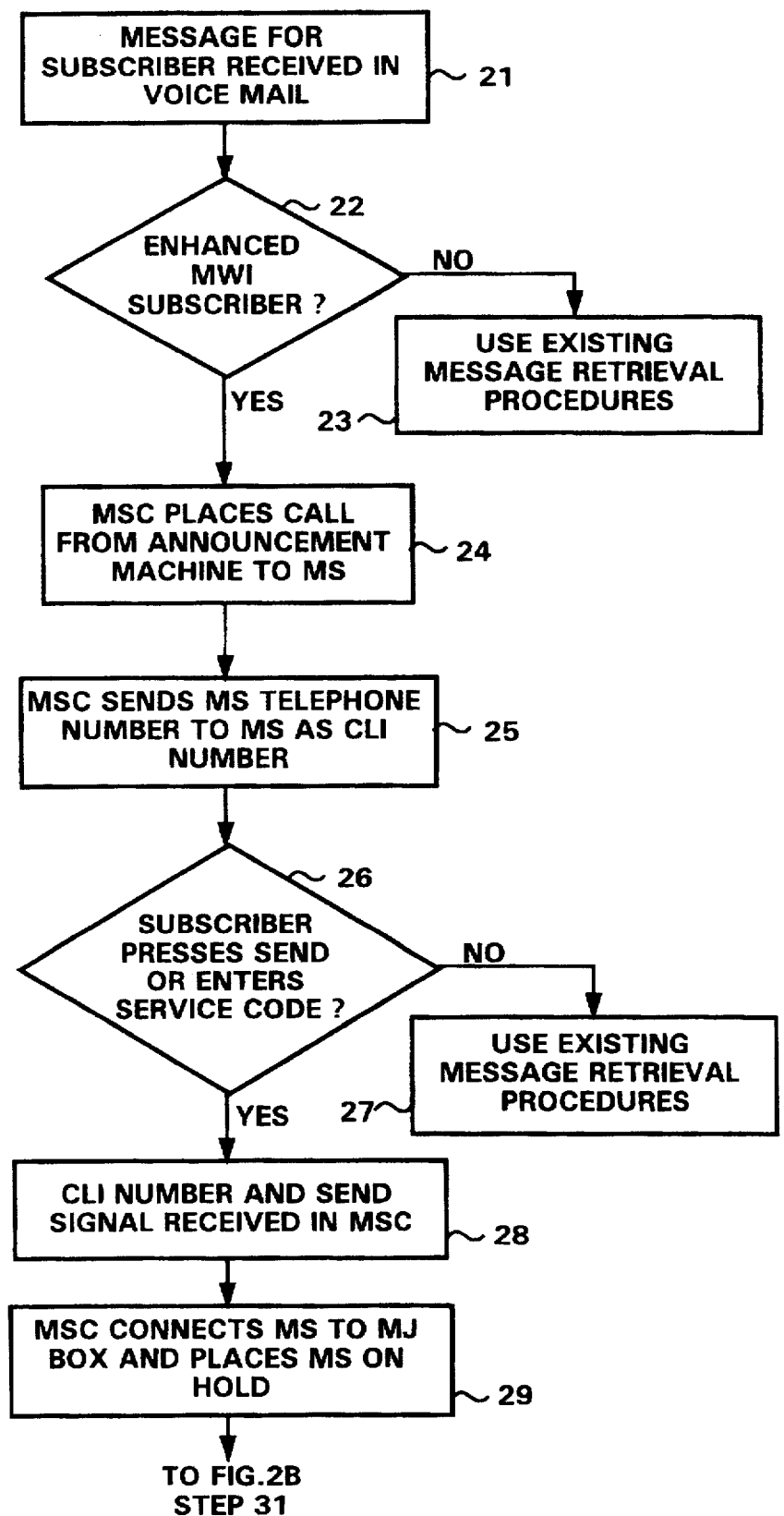

FIGS. 2A-2B are a flow chart of the steps involved in the preferred method of the present invention. At step 21, a message for the mobile subscriber 12 is received in the voice mail system 15. The MSC 14 informs the subscriber's Home Location Register (HLR) that there is a message for the subscriber in voice mail. At step 22, the HLR checks the subscriber's profile to determine whether or not the mobile subscriber subscribes to voice mail and the enhanced MWI feature. If it is determined that the subscriber is not an enhanced MWI subscriber, the process moves to step 23 where existing message retrieval procedures are utilized to retrieve the message from the voice mail system.

If, however, it is determined that the subscriber is an enhanced MWI subscriber, then the HLR instructs the MSC in which the subscriber is located to place a call from the announcement machine to the mobile subscriber. The process then moves from step 22 to step 24 where the MSC places a call from the announcement machine 11 to the mobile subscriber 12. At step 25, the MSC sends the telephone number of the mobile subscriber to the subscriber's mobile telephone as a calling line identification (CLI) number where it is displayed to the subscriber. If the subscriber desires to retrieve his message at that time, the subscriber presses the SEND key while in the conversation mode. Alternatively, the subscriber may enter an Enhanced MWI service code such as *23 while in conversation mode. At step 26 it is determined whether or not the subscriber presses the SEND key or enters an Enhanced MWI service code while in conversation mode. If not, then the process moves to step 27 where existing message retrieval procedures are utilized to retrieve the message from the voice mail system.

If, however, it is determined that the subscriber presses the SEND key or enters an Enhanced MWI service code while in conversation mode, then the process moves from step 26 to step 28 where the CLI number and the SEND signal are received in the MSC. At step 29, the MSC connects the mobile subscriber to the MJ box 16 and places the subscriber on hold. The process then moves to FIG. 2B, step 31 where the MSC connects the voice mail system 15 as the third party in a three-party call between the announcement machine 11, the mobile subscriber 12, and the voice mail system 15. The process then moves to step 32 where the MSC takes the subscriber off hold and connects the subscriber to the voice mail system. At 33, the subscriber then retrieves his messages.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for providing rapid access to voice mail messages to a subscriber in a radio telecommunications network, said subscriber having a mobile telephone with a display, and said system comprising:
   a mobile switching center (MSC), said MSC comprising:
      a group switch for routing calls; and
      hardware connected to the group switch that enables said MSC to establish a three-party call;
   an announcement machine connected to said MSC;
   a voice mail machine connected to said MSC;
   means for causing the display of the subscriber's mobile telephone to display the telephone number of said mobile telephone as a calling line identification (CLI) number when a call is made from said announcement machine to said mobile telephone announcing that the subscriber has a message in the voice mail machine;
   means for sending said telephone number of the mobile telephone to said MSC while in conversation mode; and
   means within said MSC, and operative with said hardware connected to the group switch, for establishing said three-party call between said announcement machine, said subscriber, and said voice mail machine.

2. The system for providing rapid access to voice mail messages to a subscriber in a radio telecommunications network of claim 1 wherein said means for sending said telephone number of the mobile telephone to said MSC while in conversation mode includes means for sending a SEND signal with said telephone number of the mobile telephone to said MSC.

3. The system for providing rapid access to voice mail messages to a subscriber in a radio telecommunications network of claim 1 wherein said means for sending said telephone number of the mobile telephone to said MSC while in conversation mode includes means for sending a service code with said telephone number of the mobile telephone to said MSC.

4. A system for providing rapid access to voice mail messages to a subscriber in a radio telecommunications network, said system comprising:
   a programmable mobile telephone;
   a mobile switching center (MSC) for providing radio telecommunications to said programmable mobile telephone;
   an announcement machine connected to said MSC;
   a voice mail machine connected to said MSC;
   means within said MSC for establishing a call from said announcement machine to said programmable mobile telephone announcing that the subscriber has a message in the voice mail machine;
   means within said programmable mobile telephone for determining whether said subscriber has entered an activation code; and
   means within said programmable mobile telephone for clearing said call from said announcement machine and originating a second call to the voice mail machine upon determining that said subscriber has entered said activation code.

5. A method of providing rapid access to voice mail messages to a subscriber in a radio telecommunications network having a mobile switching center (MSC) connected to an announcement machine and a voice mail machine, and said subscriber having a mobile telephone with a telephone number and a SEND key, said method comprising the steps of:
   determining whether said subscriber subscribes to an enhanced message waiting indicator (MWI) feature;
   placing a call from said announcement machine to said mobile telephone upon determining that said subscriber subscribes to said enhanced MWI feature;
   sending the telephone number of said mobile telephone from said MSC to the mobile telephone as a calling line identification (CLI) number.
   determining whether the subscriber has pressed the SEND key on said mobile telephone while in conversation mode;
   sending said CLI number and a SEND signal to said MSC upon determining that said subscriber has pressed the SEND key while in conversation mode;
   placing the call from said announcement machine to said mobile telephone on hold while establishing a third-part call to said voice mail machine; and
   connecting a call between the mobile telephone and the voice mail machine, thereby enabling the subscriber to retrieve said voice mail messages.

6. A method of providing rapid access to voice mail messages to a subscriber in a radio telecommunications network, said method comprising the steps of:
   providing radio telecommunications to a programmable mobile telephone from a mobile switching center (MSC);
   connecting an announcement machine to said MSC;
   connecting a voice mail machine to said MSC;
   establishing a call from said announcement machine to said programmable mobile telephone announcing that the subscriber has a message in the voice mail machine;
   determining, within said programmable mobile telephone, whether said subscriber has entered an activation code;
   clearing, within said programmable mobile telephone, said call from said announcement machine; and
   originating, from said programmable mobile telephone, a second call to the voice mail machine upon determining that said subscriber has entered said activation code.

* * * * *